June 16, 1936. W. H. MATTHAI 2,044,620
REFLECTOR
Filed March 8, 1935

William Howard Matthai
Inventor

By Edwin T. Samuels
Attorney

Patented June 16, 1936

2,044,620

UNITED STATES PATENT OFFICE 2,044,620

REFLECTOR

William Howard Matthai, Garrison, Md., assignor to Homeland Mfg. Co., Inc., a corporation of Maryland Application March 8, 1935, Serial No. 9,970

2 Claims. (Cl. 88—78)

The invention relates to a reflector adapted for use in various forms as in street numbers, signs, road markers and for various purposes to make these various insignia visible at night in the minimum of illumination and from any frontal angle. The reflecting surface in accordance with the preferred form of the invention is continuously waved, forming a closely related surface or group of peaks and valleys or concavities and depressions, the section taken on any line being of continuous and repeatedly reversed curvature. While this curvature is shown as spherical, the peaks and depressions being spherical sections meeting at the tangent points, other types of curvature which may be deemed preferable for the purposes in hand may be employed. Also while the material used is preferably sheet metal which may be solid or plated or otherwise coated with a noncorrosive highly lustrous metal, other materials as glass or other types of mirror surface may be used.

It is an important feature of the invention that a mirror or reflector made in accordance with the invention is visible from various angles under conditions of slight illumination whereas a flat mirror having a surface of similar reflecting qualities would under conditions of low degree of illumination be visible from but a single point to which the transmitted rays are reflected, it being of interest that while the convex portions radiate the light rays which strike them, the concavities focus and concentrate the light, adding greatly to the visibility and contributing to the effect of general luminosity produced by the convexities which receive and reflect rays transmitted from any and all directions, the total effect in any instance being that the general luminosity of the entire surface is apparent from various locations under conditions of slight illumination.

In the accompanying drawing I have illustrated a reflector or reflecting surface embodying the features of my invention in the preferred form.

Figure 1:
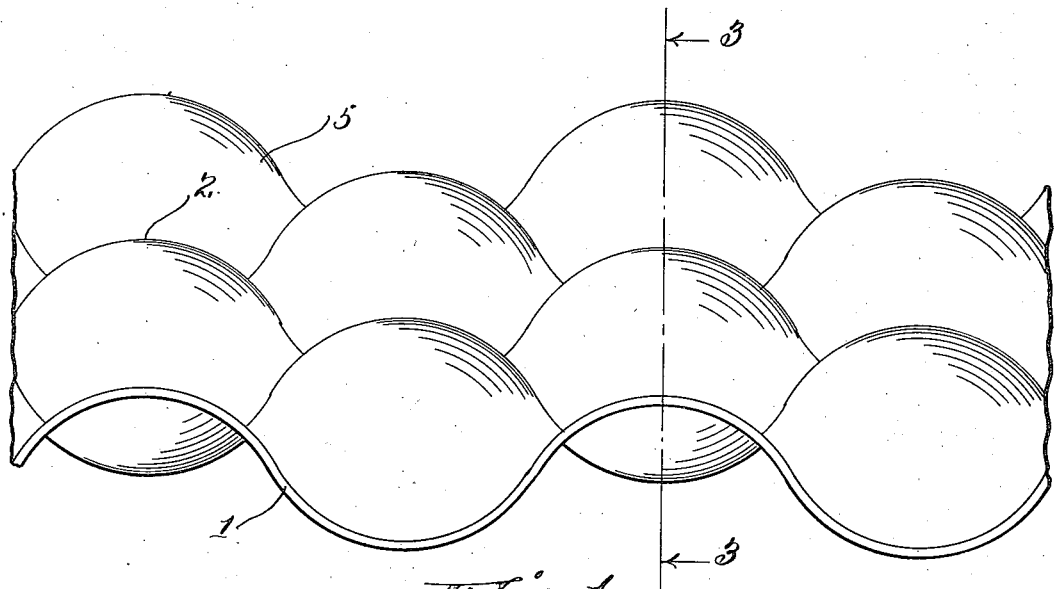
Figure 1 is a perspective view of a fragment of reflecting plate made in accordance with the invention in the preferred form.
Figure 2:
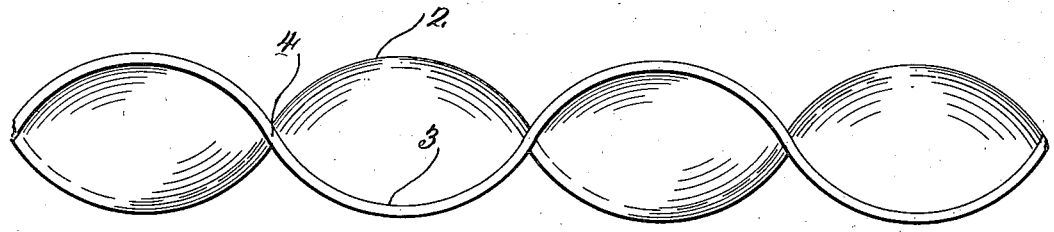
Figure 2 is a side view or edge view of the reflector.
Figure 3:
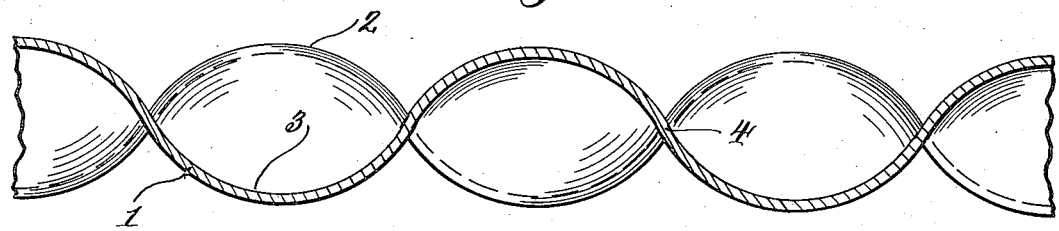
Figure 3 is a section on the line 3, 3 in Figure 1.

Referring to the drawing by numerals, each of which is used to indicate the same or similar parts in the different figures, the plate or reflector 1 is formed by bumping or pressing so that the entire area consists of a group or series of alternate convexities 2 and intervening concavities 3, otherwise referred to as peaks and valleys, respectively, the curvature shown being such that the convexities 2 and the concavities 3 are of substantially spherical curvature, the concavities and convexities meeting at tangent points 4 of these respective curves so that the side view of Figure 2 and the section Figure 3 which show the surface or plate when cut by any plane at right angles thereto, takes the form of a series of continuously and repeatedly reversed curves, or the equivalent, relatively slight variations being immaterial to the result.

The structure may be further defined as an opaque reflector or reflecting plate comprising substantially spherically curved alternate concavities and convexities, arranged in series transversely disposed each to the other, the curvature in every direction being continuous and reversed in correspondence with the said concavities and convexities, each convexity being substantially surrounded by convexities and each convexity being substantially surrounded by concavities.

As already pointed out, the reflecting surface 5 which is preferably continuous, has the effect as to the convex portions of radiating and reflecting in all directions light received from any and all directions and the concavities or valleys 3 have the effect of reflecting and focusing and thus accentuating the light from all directions from which it may strike them so that the result is that the reflecting surface is visible and conspicuously luminous even under conditions of low degree of illumination when viewed from practically every point from which it would be visible in daylight.

I have thus described specifically and in detail a reflector or reflecting surface embodying my invention in the preferred form in order that the manner of constructing, applying, operating and using the invention may be fully understood, however, the specific terms herein are used descriptively rather than in a limiting sense, the scope of the invention being defined in the claims.

What I claim as new and desire to secure by Letters Patent is:

1. An opaque reflecting plate comprising substantially spherically curved alternating concavities and convexities arranged in series transversely disposed each as to the other, the curvature in every direction being continuous and reversed in correspondence with said concavities and convexities.

2. An opaque reflector comprising substantially spherically curved alternate concavities and convexities arranged in series extending in directions transverse to each other, the curvature in every direction being continuous, each convexity being substantially surrounded by concavities and each concavity substantially surrounded by convexities.

WILLIAM HOWARD MATTHAI.